United States Patent
Rasmussen et al.

(10) Patent No.: US 6,687,063 B1
(45) Date of Patent: Feb. 3, 2004

(54) OPTICAL SYSTEM FOR CREATING COLORED FIELDS OF LIGHT AND COMPONENTS THEREFOR

(75) Inventors: Niels Jorgen Rasmussen, Arhus C (DK); Mads Glavind, Hobro (DK)

(73) Assignee: Martin Professional A/S (DK)

( * ) Notice: Subject to any disclaimer, the term of this patent is extended or adjusted under 35 U.S.C. 154(b) by 0 days.

(21) Appl. No.: 10/130,681

(22) PCT Filed: Nov. 20, 2000

(86) PCT No.: PCT/DK00/00642
§ 371 (c)(1), (2), (4) Date: Sep. 30, 2002

(87) PCT Pub. No.: WO01/37032
PCT Pub. Date: May 25, 2001

(30) Foreign Application Priority Data

Nov. 18, 1999 (DK) .......................................... 1999 01657
Jun. 26, 2000 (DK) .......................................... 2000 00095

(51) Int. Cl.⁷ ................................................. G02B 5/22
(52) U.S. Cl. ..................... 359/887; 359/885; 359/889; 359/890; 362/281; 362/321; 353/84
(58) Field of Search .................................. 359/885, 887, 359/889, 890, 892; 362/281, 293, 321, 323; 353/84

(56) References Cited

U.S. PATENT DOCUMENTS

| | | | | |
|---|---|---|---|---|
| 4,368,974 A | * | 1/1983 | Coote | 355/35 |
| 5,053,934 A | * | 10/1991 | Krebs | 362/281 |
| 6,520,662 B1 | * | 2/2003 | Dedoro | 362/280 |

* cited by examiner

Primary Examiner—Drew Dunn
Assistant Examiner—Leo Boutsikaris
(74) Attorney, Agent, or Firm—Skadden, Arps, Slate, Meagher & Flom LLP

(57) ABSTRACT

Units for projection of profiled images and for floodlighting suffer from a tradeoff between the quality of the illuminated field and efficiency. The hue, saturation, and intensity must be continuously controllable, and the quality of the illuminated field must be even. According to the invention the optical components have been refined according to a general principle which enables the use of efficient elliptical reflectors without a reduction in quality for both purposes. Each color is controlled by relatively moveable filters having a comblike structure in which the design of the individual teeth compensates for the interaction of the many variables. The intensity is controlled by mechanical dimmers which are designed according to the same principles. This construction will also improve the quality of condenser type projection systems.

24 Claims, 22 Drawing Sheets

CONDENSER OPTICS PROJECTION SYSTEM

ELLIPTICAL REFLECTOR PROJECTION SYSTEM

------- With small teeth on big teeth.
——— Only big teeth.

US 6,687,063 B1

OPTICAL SYSTEM FOR CREATING COLORED FIELDS OF LIGHT AND COMPONENTS THEREFOR

CROSS-REFERENCE TO RELATED APPLICATIONS

This application claims priority to Danish Patent Application Serial No. PA 1999 01657, filed Nov. 18, 1999; and Danish patent Application Serial No. PA 2000 00095, filed Jun. 26, 2000; and to PCT International Application Serial No. PCT/DK00/00642, filed on Nov. 20, 2000.

FIELD OF THE INVENTION

The invention relates to an optical system and components therefor for creating coloured fields of light.

BACKGROUND

In a continuously variable light beam coloration system, it is desired to change continuously the hue and saturation of the colour of a light beam in a fashion that renders the entire field to be evenly coloured for all degrees of light intensity. It is desired that the gamut of colours attainable by such a system cover as large an area of the 1931 CIE chromaticity diagram as possible. Furthermore it is desired that the intensity of the resulting colour field shall be independently controlled.

Systems that attempt such a result exist. It has been found that an acceptable range of colours can be obtained by combining three subtractive tristimulant colour filters in varying degrees. In high intensity light projectors such as are used for example in the entertainment and architectural lighting industries, the brightness of the light sources required is too high to use absorptive colour filters for colouring the light beam. So called dichroic filters are used instead which reflect the complementary colour of colour passed through the filter. Such filters display an extremely small absorption and are able to withstand the high ambient temperature and high intensity light throughput which are characteristic of such projectors. However such filters are expensive. A common configuration of such a subtractive tristimulant colour mixing system uses three filters, coloured cyan, magenta and yellow (CMY colour mixing). A further refinement may use a colour temperature correction filter (CTC) in addition which can be used to increase the gamut of available colours, but more particularly is used to vary the colour temperature of white light output. Any set of primary colours could be used to perform such colour mixing, however conventionally red, green, blue colour filters (RGB) are the only alternative to CMY actually used. Any reference in the following text to CMYC filters is equally applicable to any set of primary colour filters (plus CTC) and it is assumed that such alternatives are incorporated in any claims made.

Theoretically, any colour can be produced by combining the CMY filters to a varying degree. As an example, should a pale green colour be desired, a combination of cyan and yellow filters would be used to partially cover the output from a white light source. The degree to which the aperture is partially filled by a particular filter (and thus the degree of paleness of the colour attained) is the parameter known as the saturation. For example (theoretically) a fully saturated red would be achieved by the addition of fully saturated magenta in combination with fully saturated yellow. In practice due to the characteristics of dichroic filters, fully saturated colours are difficult to achieve by the addition of two subtractive colour filters. It is common in addition to the CMY filters to have a conventional colour wheel with red, green and blue filters mounted thereupon to achieve full saturation of these colours.

When mixing CMYC filters, it is essential that the level of saturation of a particular filter be evenly distributed across the field otherwise a mosaic or bands of colours rather than a mixture will be achieved.

The above filters are used in various light projection systems. Two principal methods are used to project light, each one having its respective advantages and disadvantages. Referring to FIG. 1, the condenser system provides the simplest system for evenness of lighting across the beam (flat field) and for projection purposes, however at the cost of efficiency and weight of the lens system. A substantial amount of the light output from the source is not transmitted via the projection lens, and this constitutes a loss in efficiency. Optics such as these are used when brightness is not as much a priority as image projection quality.

The most efficient (brightest for a particular light source) type of light directing system is the elliptical reflector system. This places the source at one focus of the ellipse and thus forms an image of the source at the other. It is common to place the CMYC filters as close to this second focus point as possible in order that the filters may be as small as possible. It will be noted from FIG. 2 that the incident light makes an angle $\phi$ with the filter ($\phi$ naturally being dependent on from where in the source the light was emitted). It will also be noted that when the filter is placed at the focal point of the ellipse, the radial distribution of the light incident on the filter matches the radial distribution of the source. The intensity at the centre of the beam is thus significantly larger than on the periphery (this phenomenon is also termed the hotspot). Further useful observations about the two above optical systems that are pertinent to colour mixing systems, concern the characteristics of the source itself. For most applications, highly efficient discharge light sources are employed. These are brighter and give out less infra-red radiation then their more conventional halogen (filament) counterparts. Also, because light is produced at an arc gap, the source of light is smaller and thus behaves more like a point source which renders the optical system more efficient. However, the light that is incident on the colour filter has spectral and as well as intensity dependence on r, $\theta$, and $\phi$ (see FIGS. 1 and 2). The effect is greatly reduced in condenser optics systems as $\phi$ is small in this case. If one is to a design a coloration system that is applicable to both optical systems certain conditions have to be fulfilled, and one comes to the following conclusion. If a certain percentage saturation of a particular filter is required, then ideally one needs to colour the same percentage for each of the components of incident light passing through the coloration system; moreover, that coloured portion needs to be evenly distributed over the range of each spherical component—radial angle ($\theta$), radial distance (r) and azimuth ($\phi$).

Having satisfied this condition, we will see that an even distribution of saturation is achieved across the entire field. This will then mean that the necessary conditions for varying intensity are necessarily also met. However, it is particularly desirable to provide a system which will permit the elliptical reflector system to function both in a projection (profile) environment and in a floodlighting (wash) environment.

The geometrical relationship shown in FIG. 3a relates to the use of an elliptical reflector system for projection purposes. The image to be projected (frequently of the gobo type which is a profiled cutout in an opaque material) has to be placed at the location where the cross section of light is smallest in order that maximum use is made of the light flux available. The ray path following the image has to held free of optical abberations, because a projection lens must create a high quality projected image at the intended image plane. This means that the filtering system for changing hue, saturation, and intensity may advantateously be placed in the ray path preceding the image. In order that the filtering system does not become unwieldy, the cross section of the light flux at the filtering system must not be too large. This in turn means the individual rays display a range of azimuth angle $\phi$ which is larger than in known condenser systems, and for this reason the improved filtering systems must be adopted.

The geometrical relationship shown in FIG. 3b relates to the use of an elliptical reflector system for floodlighting or wash purposes. In this type of use, the filters, including various effects not covered by the present application, have to placed at the location where the light flux is maximum. This location is then projected as a blurred image at a remote location by means of a short-focus projection lens incorporating a diffuser. In order that such a floodlight may be as small as possible, the elliptical reflector used creates a much larger range of azimuth angle $\phi$ than in the projection case, and this means a different adaptation of the filtering system according to the invention than in the case of image projection.

That the conditions are met is particularly important for systems using discharge sources for which intensity is necessarily varied by mechanical means. Indeed one aspect of the present invention is a mechanical dimmer system which utilises similar principles as the coloration system according to the invention.

Various methods have been tried to meet the conditions. One of the most commonly employed is the 'finger' wheel consisting of a number of concentric wedges of dichroic filter material (see FIG. 4). By rotating the disc in an anticlockwise direction, the amount of the beam intercepted by the filter increases. The increase is very gradual, allowing for smooth changes in colour saturation. The wheel generally has a cut out (the glass removed entirely) for 0% saturation (no colour—known as open white) to remove any losses at the surface of the glass onto which the dichroic filter is adhered. The finger wheel has several substantial disadvantages. First of all, due to its large area, the cost of coating the glass wheel with the appropriate filter is quite high. Furthermore, it is expensive to cut a piece of glass in a customised shape—in this case circular with the cut out for open white. More fundamentally, the increase in saturation occurs from one side of the field only. Hence the distribution of coloration is asymmetric across the beam. Under certain circumstances, the fingers themselves can be seen entering the field from one side. This happens because of problems associated with etching the fingers on the wheel. It is very difficult to obtain portions of dichroic coating narrower than 1 mm using an etching process. The fingers are thus not sufficiently tapered at their extremes. For this reason, the transition between high saturation and full saturation can be very noticeable, as one side of the field is fully saturated and the other significantly less so. The difference is very obvious to the human eye as it is very sensitive to imbalances in the distribution of coloured light. However the dependency of the coloration of the beam as a function of $\phi$ is satisfied.

A variation of the finger wheel is a so-called raster wheel. This has a randomly distributed proportion of dichroic filter adhered which increases as the disc is rotated. Because the coating is randomly distributed, when the wheel is static the above conditions are met very satisfactorily. The same disadvantages of asymmetry apply as for the 'finger' wheel, however. Moreover, the problems associated with etching are even more critical for a raster wheel. In addition there is the major disadvantage that the distribution, though random, does not change in a random manner—it can be seen to move very perceptibly as the disc is rotated. A variation that alleviates the necessarily asymmetric nature of gradated wheels are colour flags. These are flags which gradually drop into the field by nature of being rotated about an axis. They come into the beam from diametrically opposite sides. To alleviate the obvious poor radial distribution, it has been known to give the edges of the flags a toothed structure.

One type of system (as described e.g in U.S. Pat. No. 5,426,576 and U.S. Pat. No. 5,969,868) achieves continuously variable hue and saturation of a light beam without using a combination of subtractive tristimulant colour filters. It uses continuously spectrally graded filters which have a continuously varying hue characteristic along a first axis and a continuously variable density (or saturation) along a second axis perpendicular to the first axis. Despite the effectiveness of the technique, the filters themselves are extremely expensive, costing some ten times more than the CMY systems described above.

Finally there are linearly translatable filters. Two toothed combs of filters are brought symmetrically into the field along a diametrical axis in a linear fashion (FIG. 5). The 'fingers' (or 'teeth') on each comb interlace so that when the fingers are on the periphery (low saturation) as much light as possible is taken from the middle of the field (low r) as the edges (high r). It is an effective system, but in its simple form has one significant disadvantage which the present invention sets out to alleviate. It has been determined that while this type of filter works well in the environment of a condenser system, it does not work well with the elliptical reflector system, because of the much increased range of azimuth angle $\phi$.

SUMMARY

Units for projection of profiled images and for floodlighting suffer from a tradeoff between the quality of the illuminated field and efficiency. According to the invention the optical components have been refined according to a general principle which enables the use of efficient elliptical reflectors without a reduction in quality for both purposes.

When the linearly translatable combs of interlacing fingers are illuminated with light that is not normal to the fingers, which which is the case for much of the light emitted from an elliptical reflector, light of the complementary colour to that desired suffers internal reflections between the fingers and passes through (see FIG. 17). Despite the coated side of the glass combs being put face to face, there is necessarily a gap (in the order of 1 mm) between combs which allows them to move over one another. This causes blotches of the undesired colour to be produced across the field (FIG. 16). One important aspect of the present invention seeks to rectify this colour unevenness. In the following, the expression "white" light may be used for the light entering a set of filters, irrespective of the filtering it may have been subjected to in preceding filters.

BRIEF DESCRIPTION OF THE DRAWINGS

The invention will be described below with reference to the drawings, in which

FIGS. 19–22 show the set of filters according to the invention with varying degrees of overlap, in which FIG. 22 shows the position which causes maximum saturation;

DETAILED DESCRIPTION

The improvements are realised in a construction according to the characterising parts of the claims that follow. In one embodiment, the realisation of the precise interaction between the teeth in the filters is materialised in the need for the devitiation from a simple geometry of the individual teeth. In this embodiments certain features are provided, which are mainly of importance during the initial closure of the filters in a set, i.e. at low levels of saturation. Other features are provided, which are mainly of importance during the final closure of the filters in a set, i.e. at high levels of saturation. In another aspect of the invention, features are provided, which are mainly of importance in embodiments relating to the use of the optical system for floodlighting. Another feature is provided, which is a cost-effective solution in embodiments relating to the use of the optical system for projection. In one embodiment, certain situations of overlap may be simplified by skewing the filters in a set relative to each other. In yet another embodiment, the invention provides a solution to a problem of reflection from the first face of a filter a set, in that the reflection of light is thrown back with an angle with respect to the optical axis which is greater than the angle of the incident ray. The invention also provides a solution to the problem of obtaining an even correction of colour temperature in that the filter system for this particular purpose is structured according to the principles covered by the present invention. In some embodiments, the principles of tooth shaping according to the present invention are brought to bear upon dimming of light by variable shutters.

Figure 17:
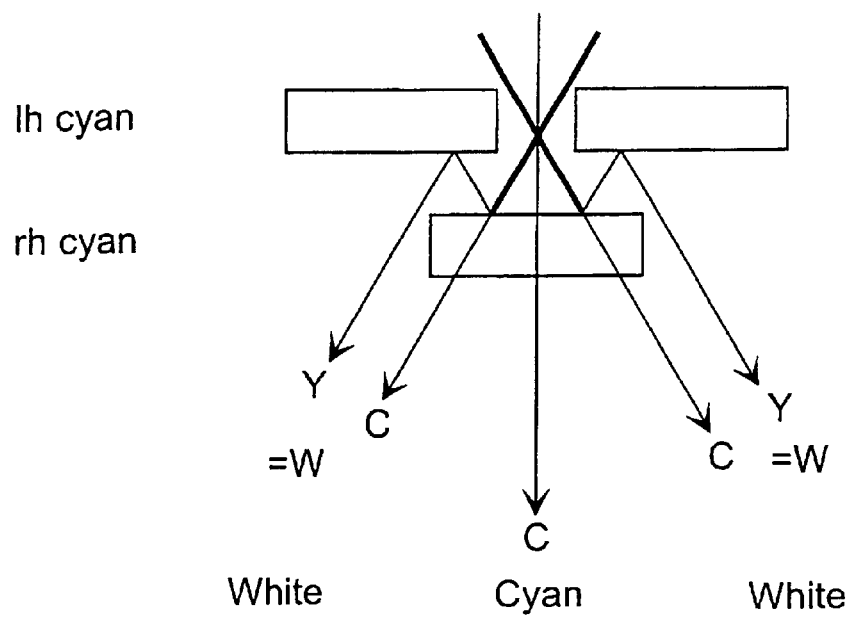
FIG. 17 diagrammatically shows a situation similar to FIG. 16 in which white light is reconstituted although it is not in the direct ray path.
Figure 23:
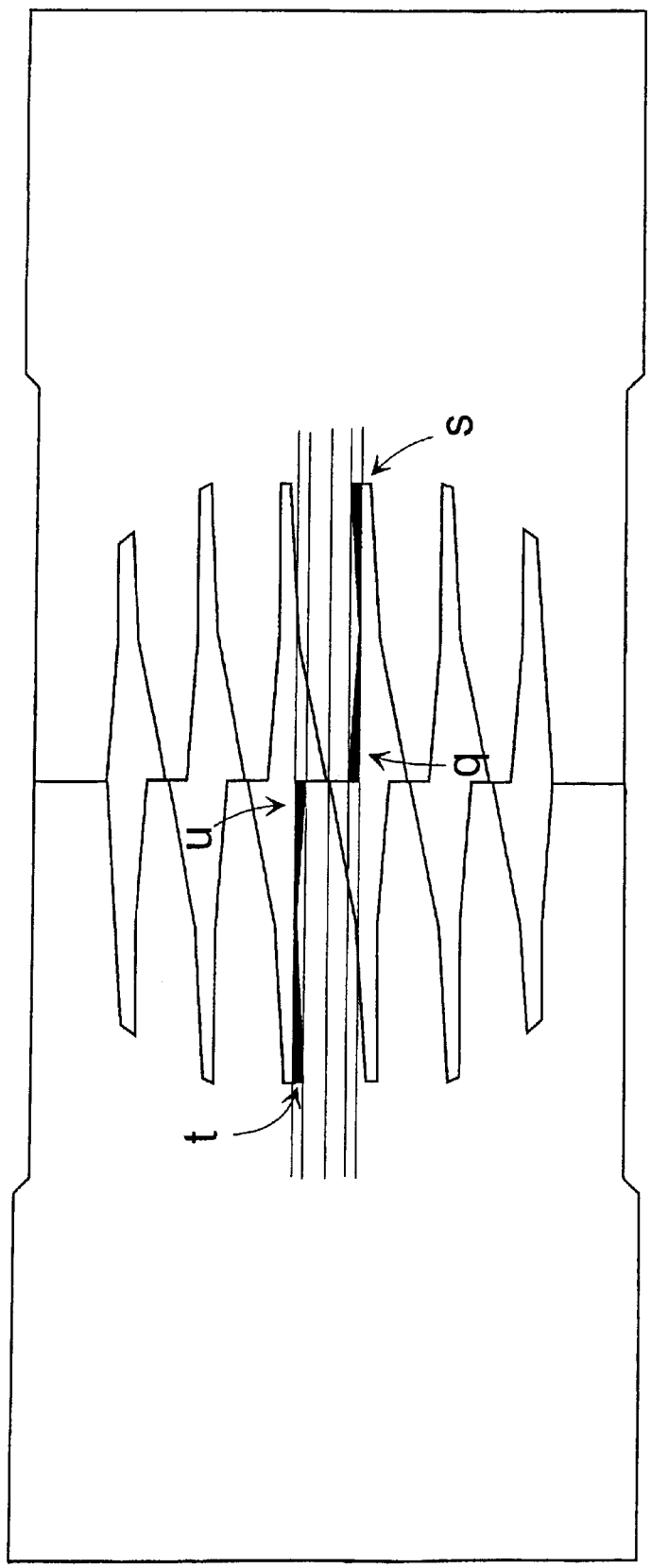
FIG. 23 shows an embodiment of the invention, which differs from FIG. 18, in which multiple reflections are blocked for a greater range of overlap.

One embodiment of the invention in particular for use in a floodlight system improves the radial distribution of coloration as the combs approach each other. The performance of the invention may be best understood by considering the practical embodiment as comprising a number of steps. There are various manners in which the fingers may be modified according to the invention in order to improve the radial distribution, as shown in FIG. 23 where four locations for modification are identified with respect to FIG. 18. One manner is to widen the end of the fingers with respect to the distance between the fingers to provide an overlap rather than a pure interlacing as the fingers approach each other). For low saturations the field will then become significantly more coloured on the edges rather than the middle. To alleviate this, a point of inflexion A (see FIGS. 18, 19) has been introduced along the length of the finger to make it relatively narrower at the end with respect to the base. This improves the radial distribution of the coloration across the field. This solution does not simultaneously reduce the effect of undesired reflections between the combs, but as shown in FIG. 17 this phenomenon may still appear for certain angles (φ). However, this phenomenon may be put to good use.

Figure 1:
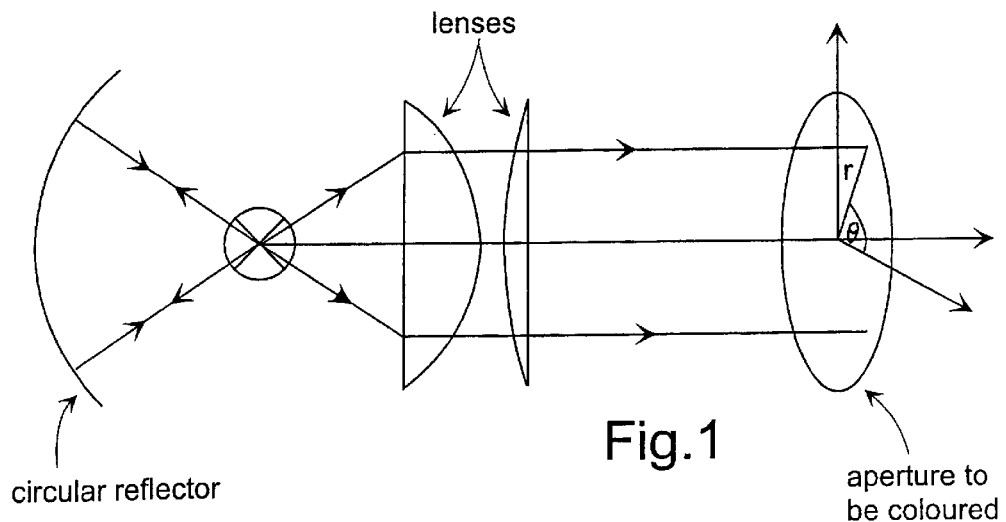
FIG. 1 shows a conventional condenser-type projection system.
Figure 2:
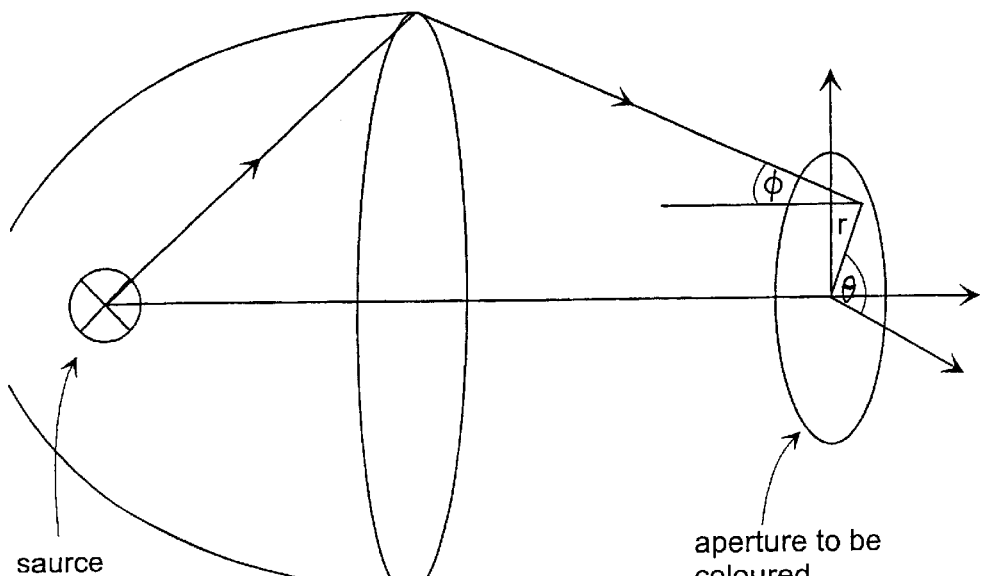
FIG. 2 shows a projection system using an elliptical reflector.
Figure 3A:
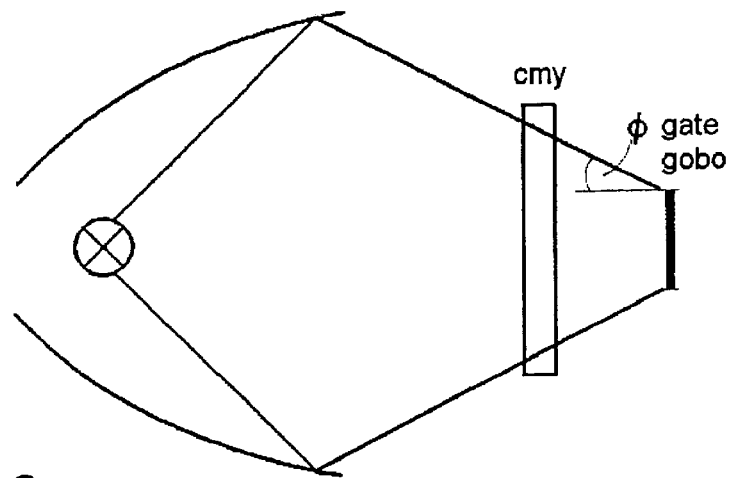
FIG. 3a shows the principle of an elliptical reflector system for projecting images.
Figure 3B:
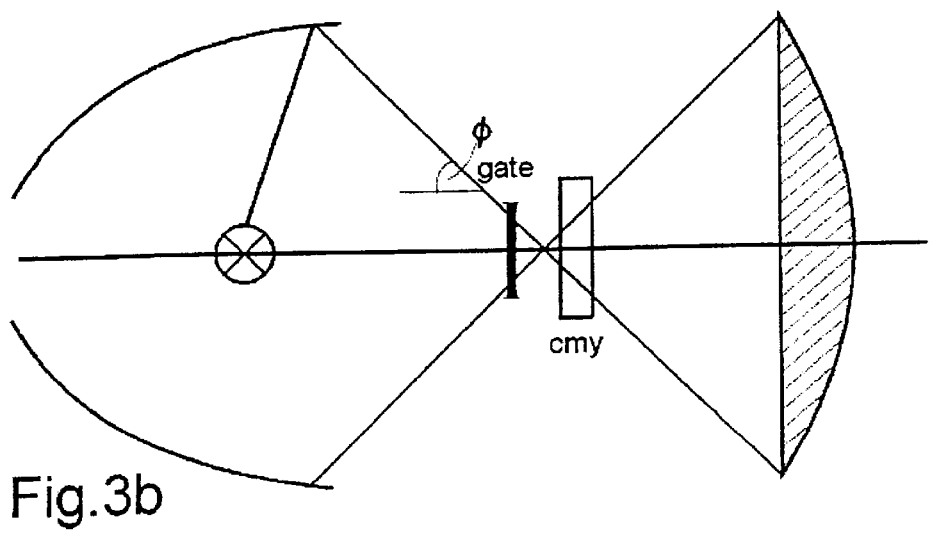
FIG. 3b shows the principle of an elliptical reflector system used in flood-lighting.
Figure 4:
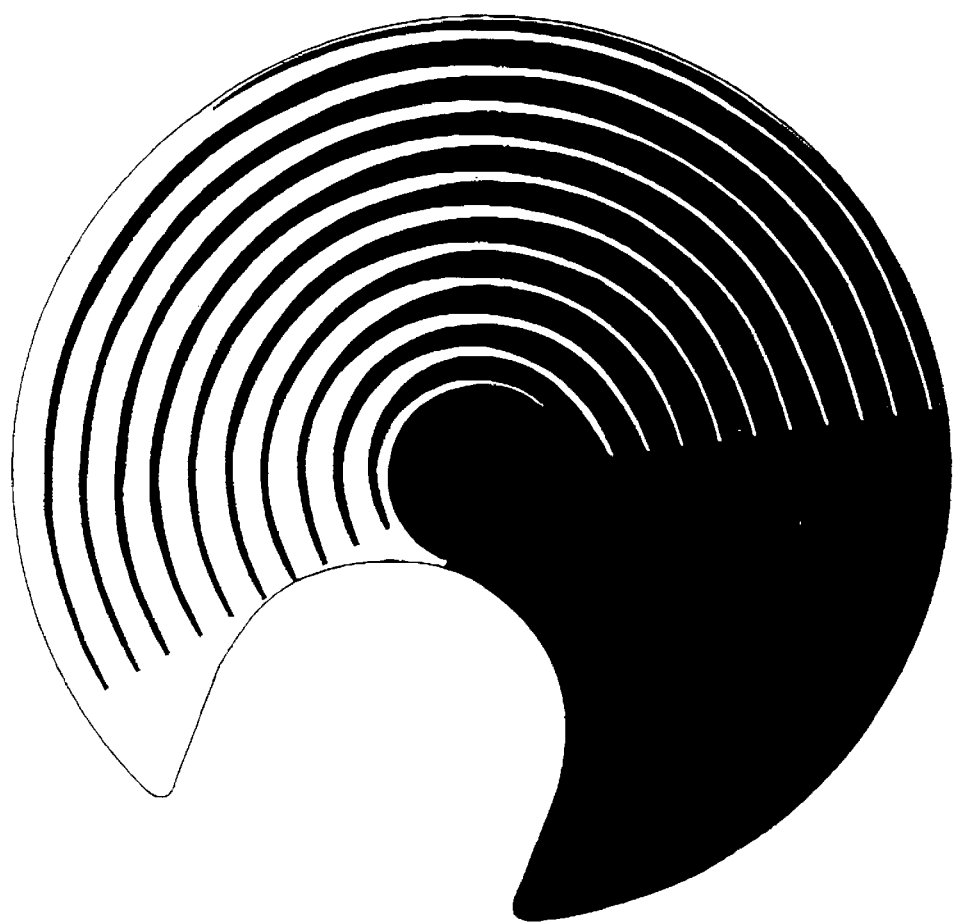
FIG. 4 shows a filter wheel according the prior art for changing the saturation of a colour.
Figure 5:
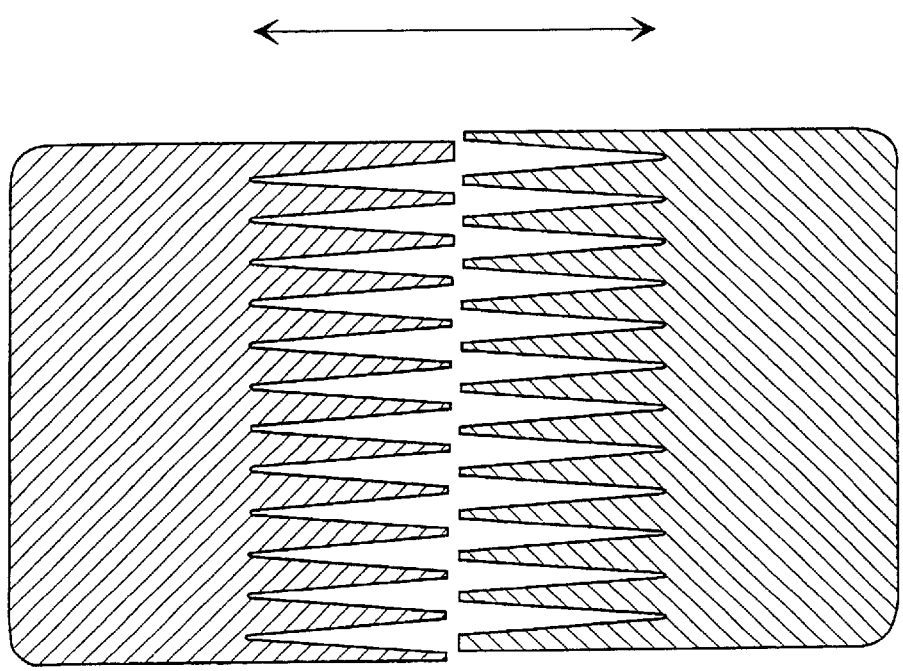
FIG. 5 shows two simple interacting comblike structures for changing the saturation of a colour.
Figure 6:
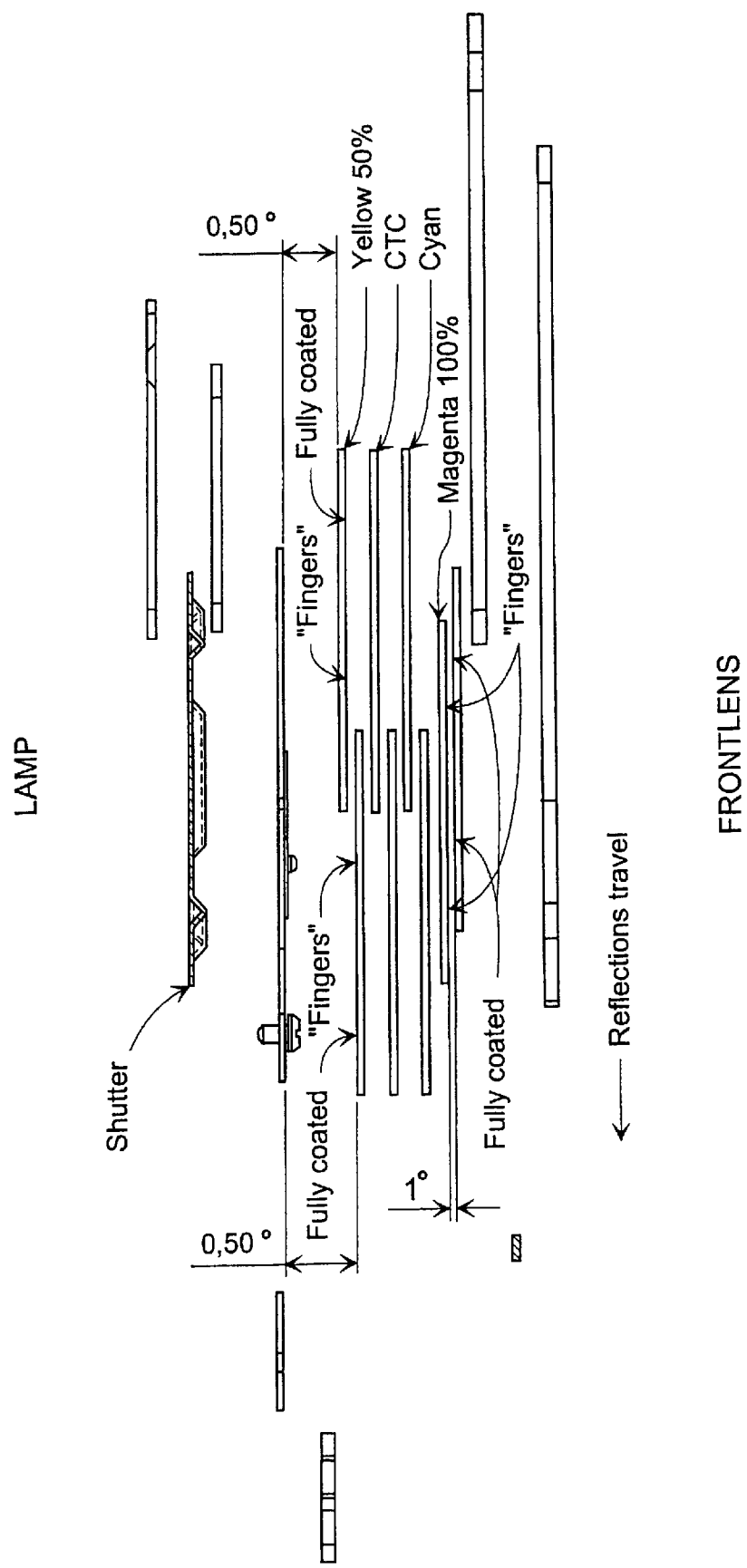
FIG. 6 is a side view of the principle of using three filter sets of coloured comblike structures for CMY and one set for CTC in a compact construction.
Figure 10:
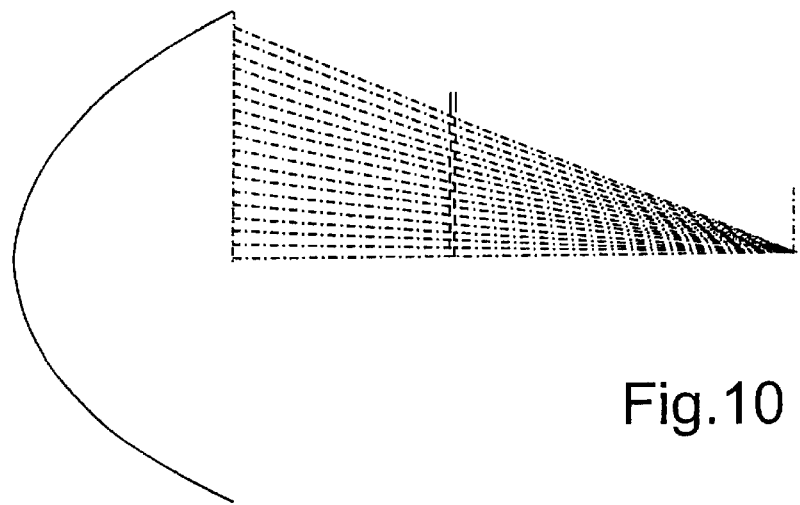
FIG. 10 shows a number of rays displaying a number of angles φ of incidence on the sets of filters when an elliptical reflector is used.
Figure 11:
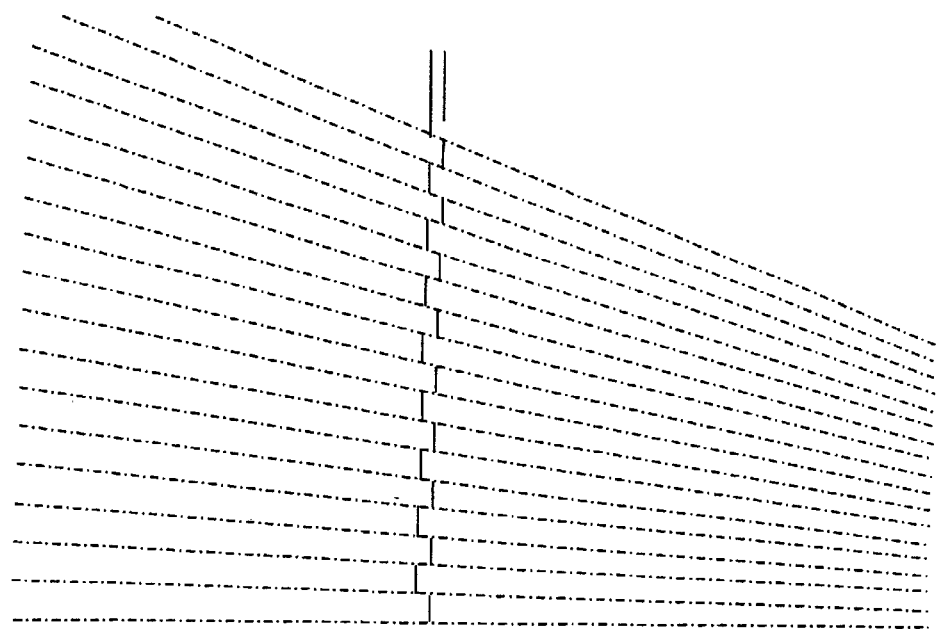
FIG. 11 shows an enlargement of the rays and angles of incidence.
Figure 14:
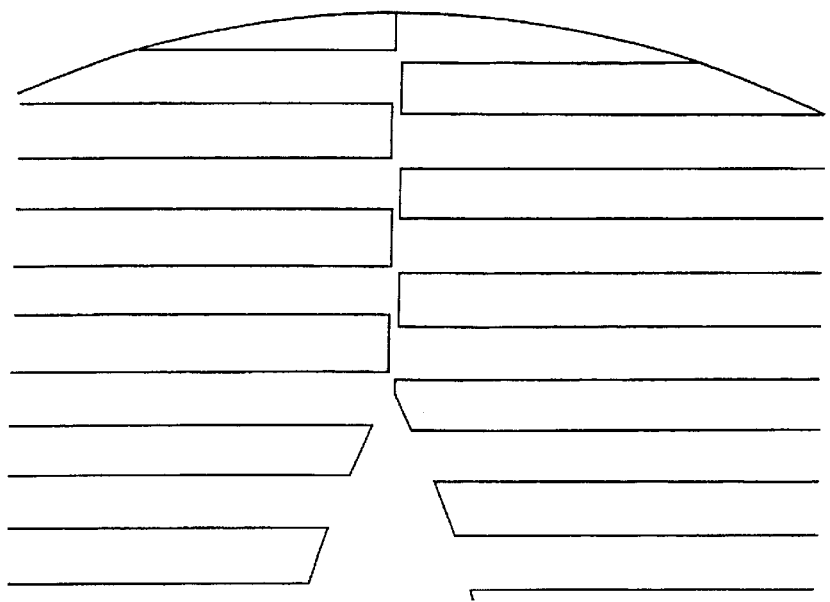
FIG. 14 is an enlargement of the situation shown in FIG. 13.
Figure 15:
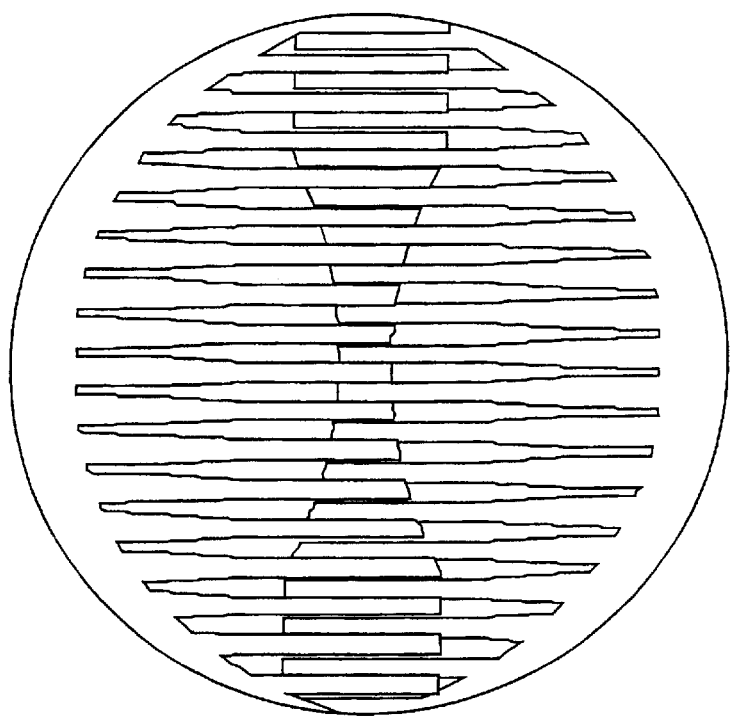
FIG. 15 shows a set of filters as shown in FIGS. 12-14 in a position where the filters overlap to a certain degree.
Figure 16:
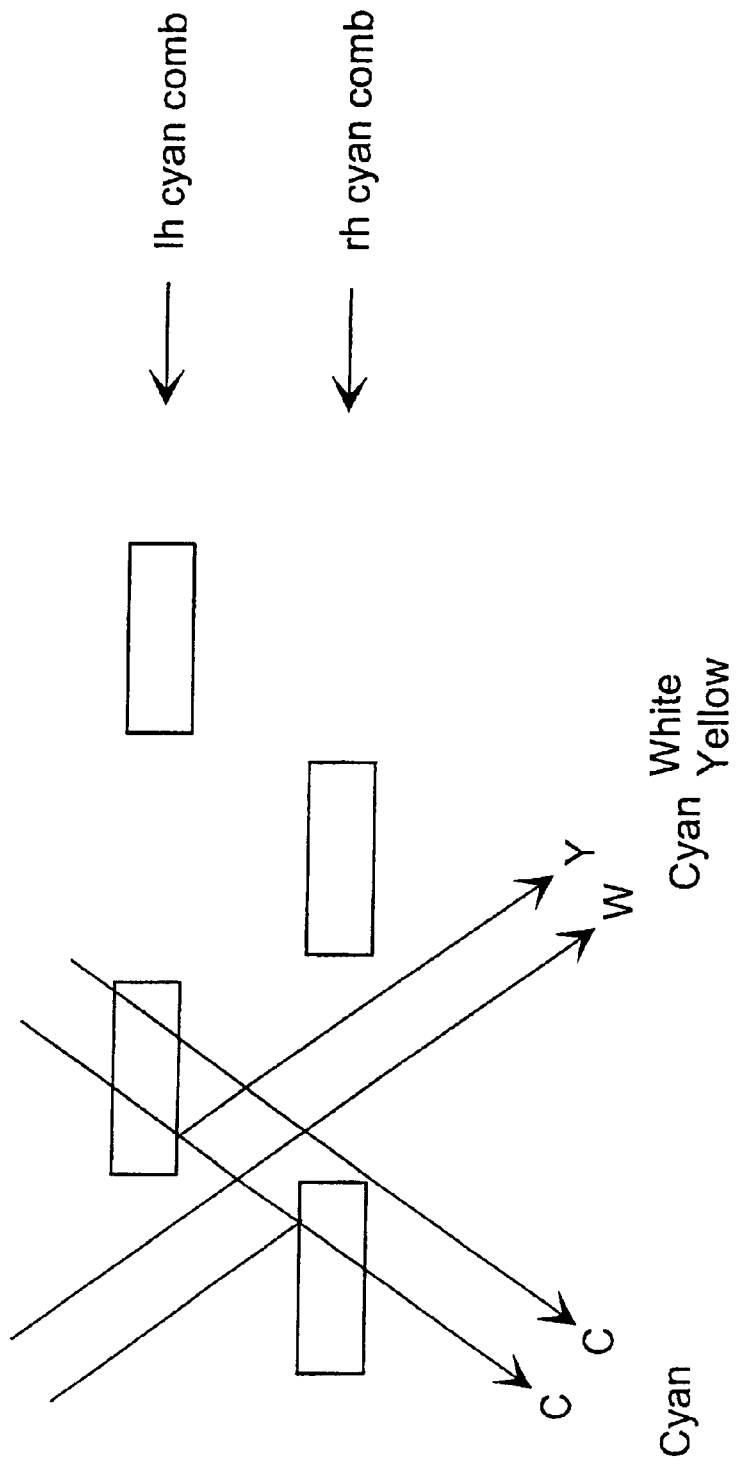
FIG. 16 diagrammatically shows the principle of multiple reflections from the front and back surfaces of dichroic filters at large incident angles creating coloured mosaicing, striping, or blotching, unless such reflections are blocked by the design of the teeth of the tomblike structures and local deficiencies in illumination is eliminated by re-constituted colours.
Figure 18:
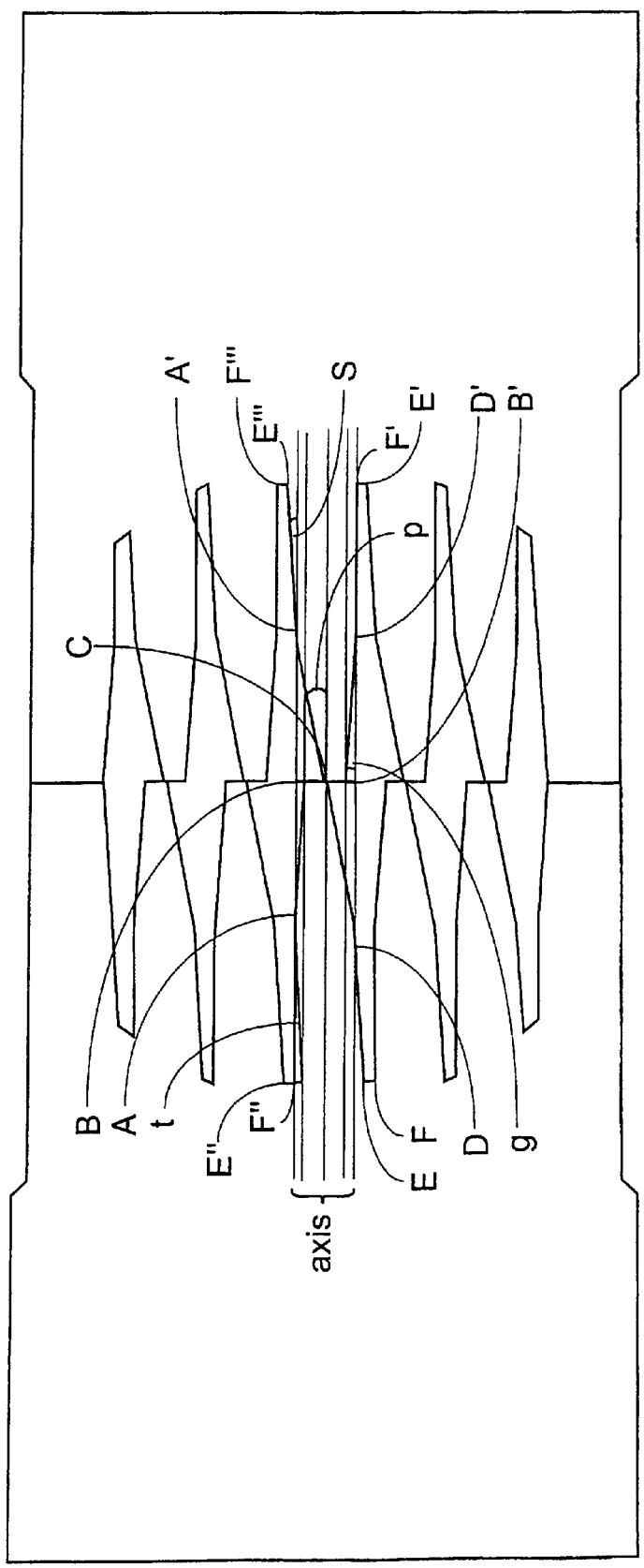
FIG. 18 shows one embodiment of the invention in which multiple reflections are blocked and where the two filters are positioned edge to edge, as well as showing where modifications to the simple tooth shape may advantageously be applied.
Figure 19:
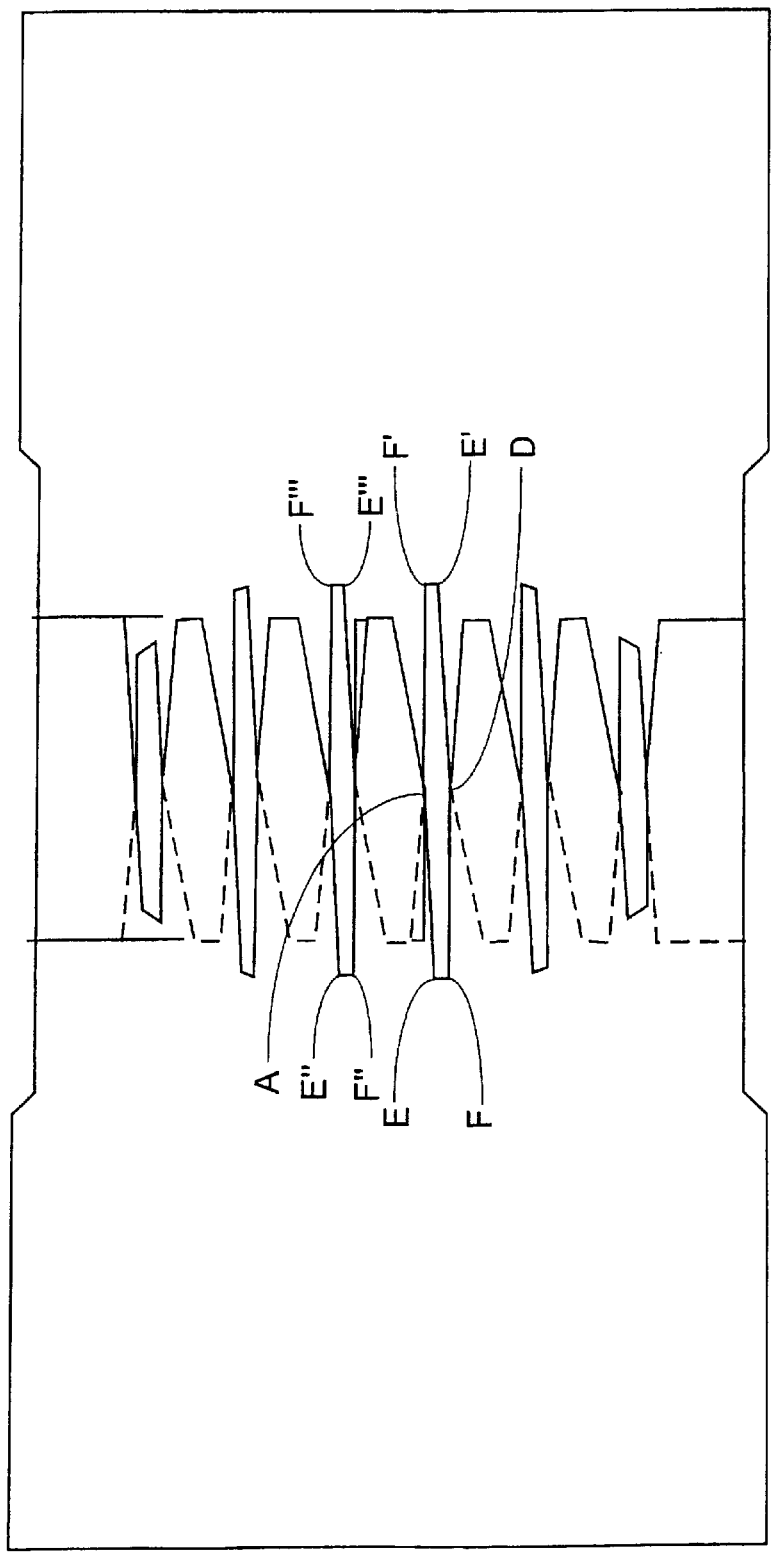

If the filters are placed at a significant distance from the focal plane of projection which is a common case for a profile projection system, it has been observed that the undesired effects due to reflections between the filters become insignificant, because the angle φ is now smaller (see FIG. 3b). Further refinements can thus be made in order to get an even better uniformity of colour mixing across the light beam, for all degrees of saturation. These are based on the following principle: If the filters are placed before the focal point of the elliptical reflector which is the case for a profile projection system, the angle at which the light strikes the filters will vary as a function of radial distance across the aperture. The phenomenon is illustrated in FIG. 10. If the comb filter's teeth are aligned such that when the filters overlap, there is no gap between the teeth for the angle at which that portion of the aperture is illuminated, no undesired light will pass. This idealised filter configuration is shown in the enlargement in FIG. 11. This configuration of teeth can be achieved by slightly squashing the fingers of the comb together at the top and bottom of one of the filter pair as shown in FIG. 15. This slight squashing together of the comb fingers on the edge of one of the filters is shown in more detail on FIG. 14 for the case when the fingers just meet. A compromise between the interlacing fingers that provide a good radial distribution of coloured light and partially overlapping finger in a simpler configuration may be used as shown in FIG. 18. Here, the ends of the first half of the fingers are skewed so that there is always a partial overlap adjacent to the "white" light throughput as the combs approach each other. Once the first half of the fingers have fully overlapped (FIG. 19), a similar skewed effect is obtained for the second half of the fingers. This serves to provide an even distribution of coloured light radially across the field for all angles of $\phi$, no matter what the position of the combs.

Figure 12:
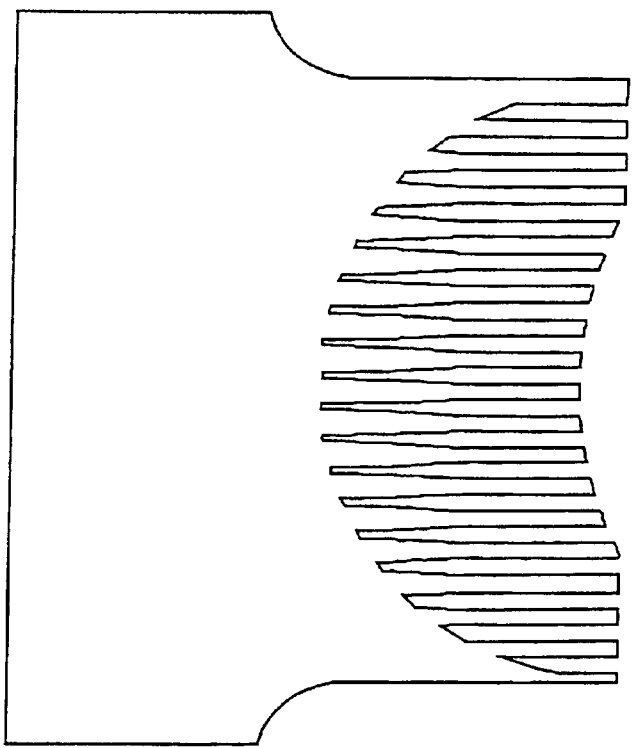
FIG. 12 shows the filters in a set of tomblike structure according to one embodiment of the invention.
Figure 12:
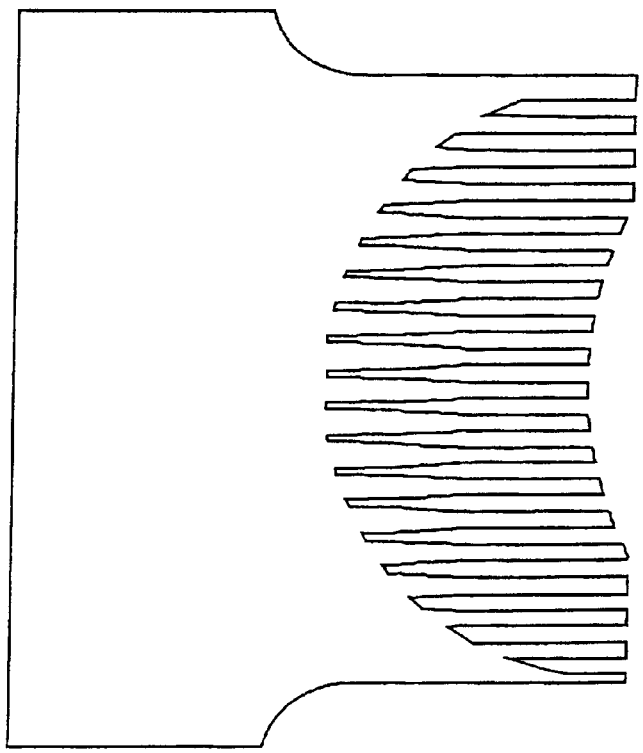
Figure 13:
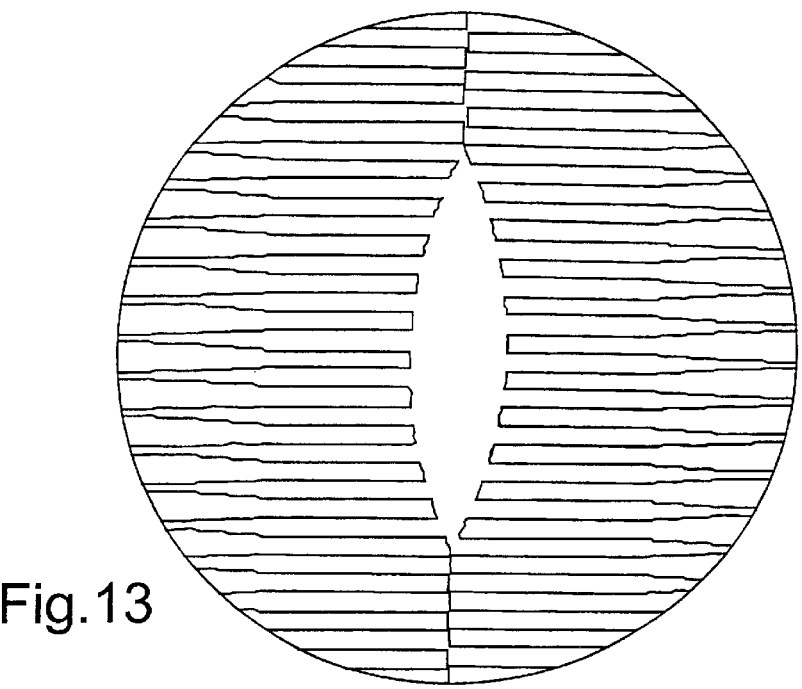
FIG. 13 shows a set of filters as shown in FIG. 12 in the position where the filter glasses are edge-to-edge (begin to overlap)

It will be noticed from FIGS. 12 and 13 that there is a further refinement in so far as there is a semicircular cut out on the edge of each filter. This is added so that the light is coloured as much in the top and bottom of the field as it is in the sides when the filters approach each other. Each tooth has a number of points of inflection along each side so that the fingers skew together as they approach one another. The preferred embodiment has at least two points of inflection on each edge as opposed to the single point illustrated in FIGS. 18 and 19. The skewing of the filters against each other serves to colour as uniform a sample across the light beam as is possible for all degrees of saturation.

Separate pairs of comblike structures are required for each of the CMYC filters. It will be appreciated that there may be an optical advantage to have these pairs of combs aligned along different axes. In the above described embodiments they are all aligned along the same axis for mechanical convenience.

It should be mentioned that the number of teeth in the comblike structures is equally a design parameter which will influence the individual tooth shape.

It should be noted as well, that because the edges of the fingers are approaching along a skewed angle, a problem caused by poor resolution in the etching of the extremes of the fingers is alleviated.

In a series of embodiments the geometry of the individual combs is indicated in FIGS. 18 and 23. The angles of skew are given as p, q, s, t relative to the axes shown parallel to the translational movement of the combs. It will be noted that the angle t=0 in this particular embodiment. The angle p and hence the amount of overlap is set with respect to angle q—the determining factor for the distance between fingers along the length of the finger. Adjustment of these angles accordingly make the throughput of 'white' light equal for all $\phi$ (as indicated above). Similarly for angles s and t.

As the fingers approach each other, edges AC and A'C form partial overlaps allowing for the constructive reflections of the type shown in FIG. 17 and letting through an appropriate amount of 'white' light (still referring to light not filtered by the discussed set of filters) for all positive angles of $\phi$ depending on the amount of saturation required. Simultaneously edges B'D' and DC skew allowing for constructive reflections for all negative $\phi$.

Once A'C and A'B have completely overlapped, (see FIG. 19) then edges E'D and FD skew against each other forming a partial overlap (giving constructive reflections for all positive $\phi$). Similarly for edges AE and AF' (constructive reflections for all negative $\phi$). At the same time a comparable amount of 'white' light is passed for $\phi=0$.

Figure 20:
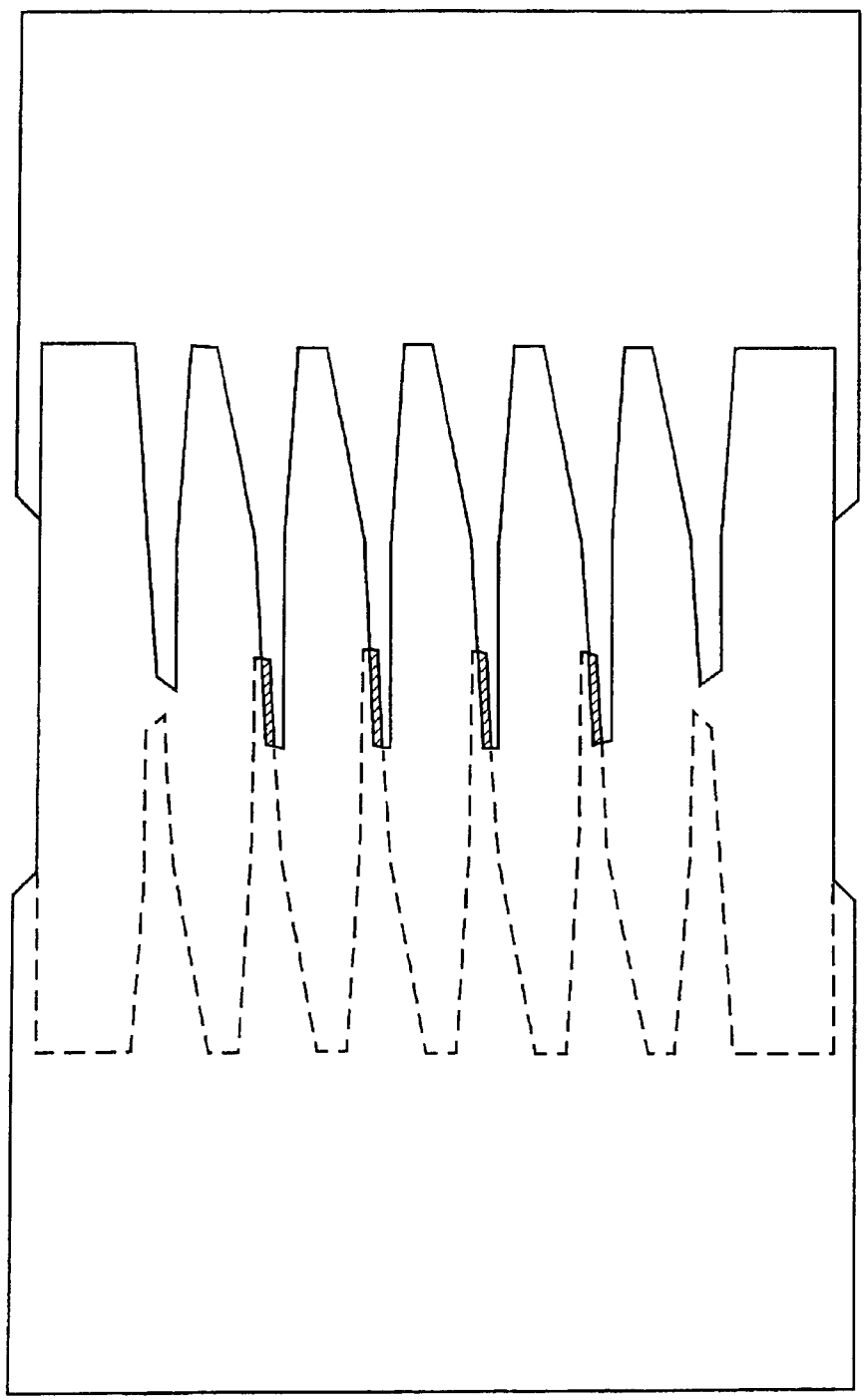
Figure 21:
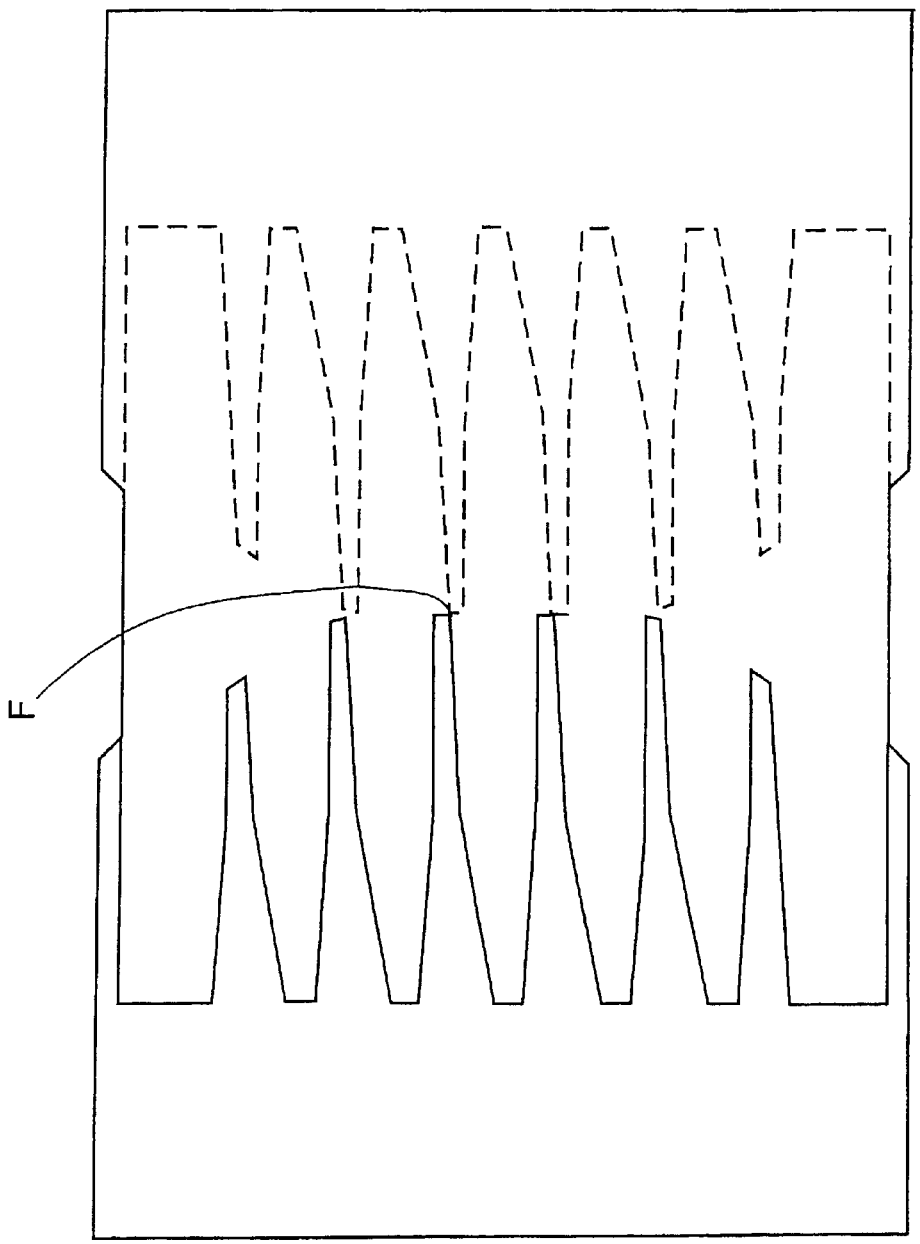
Figure 22:
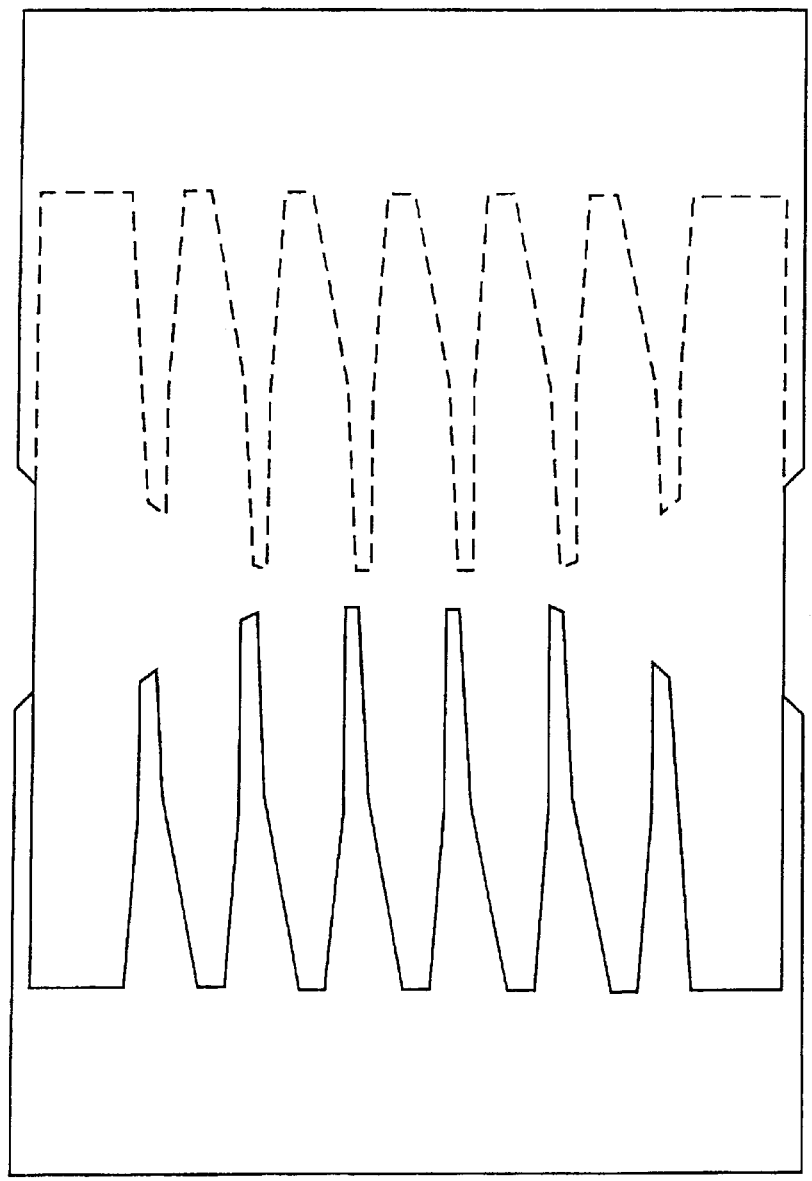

FIG. 20 shows the combs just before full overlap and FIG. 21 shows the combs at full overlap. There is a negligible amount of internal reflection at the ends at point F (as shown in FIG. 21). Therefore in operation, the combs are made to over overlap as shown in FIG. 22 for full saturation.

It should be noted that for this embodiment the extreme edges of the first and last fingers of each comb, the angles s and t are made equal to p and q respectively (as shown in FIG. 23). This is to even out the radial distribution at the top and bottom of the field. It should be noted that in FIG. 23 wedges q, s, t indicate areas which are also shown in FIG. 18, whereas the wedge u is an additional skewing of the fingers. For clarity they are shown on the middle fingers only.

The Mechanical Construction of Each Set of Filters

Figure 7:
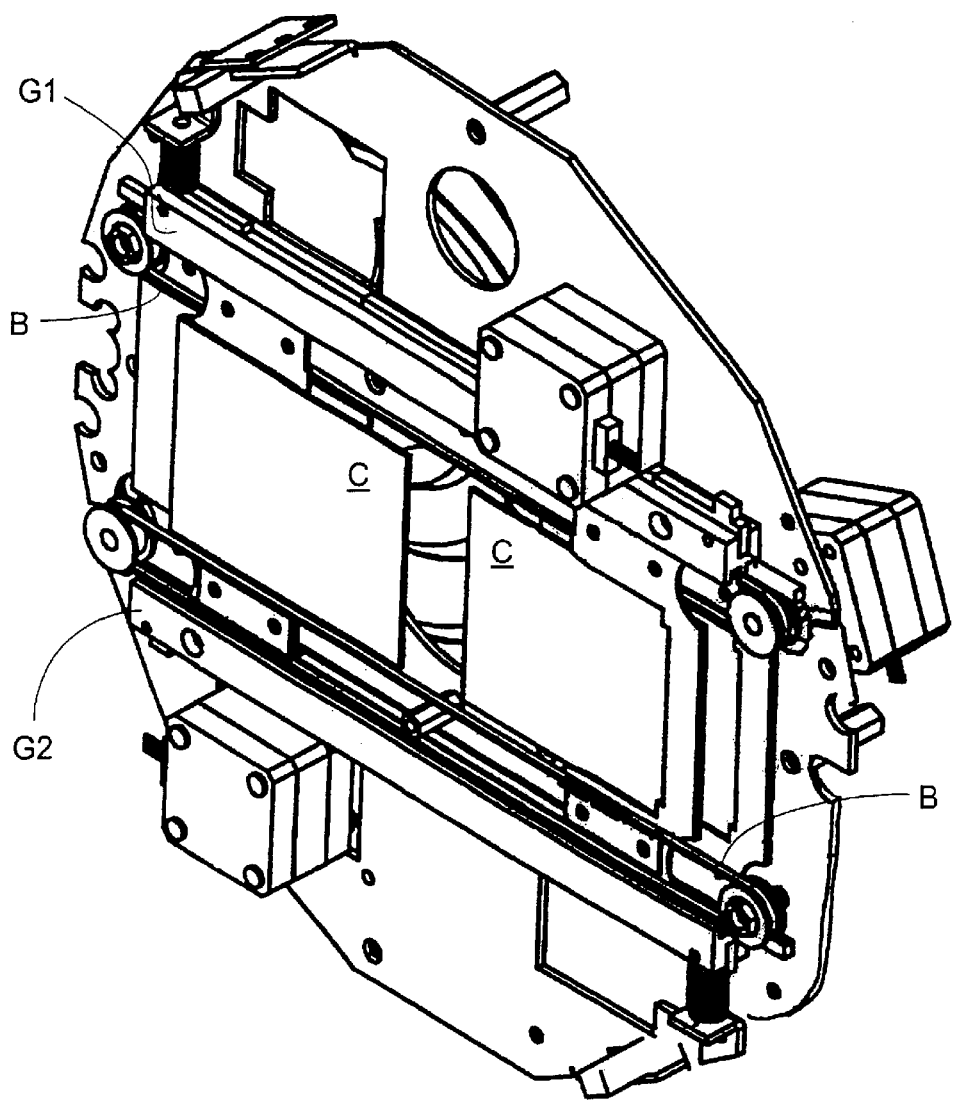
FIG. 7 is a perspective view of one of the sets in a compact construction shown in FIG. 6.
Figure 8:
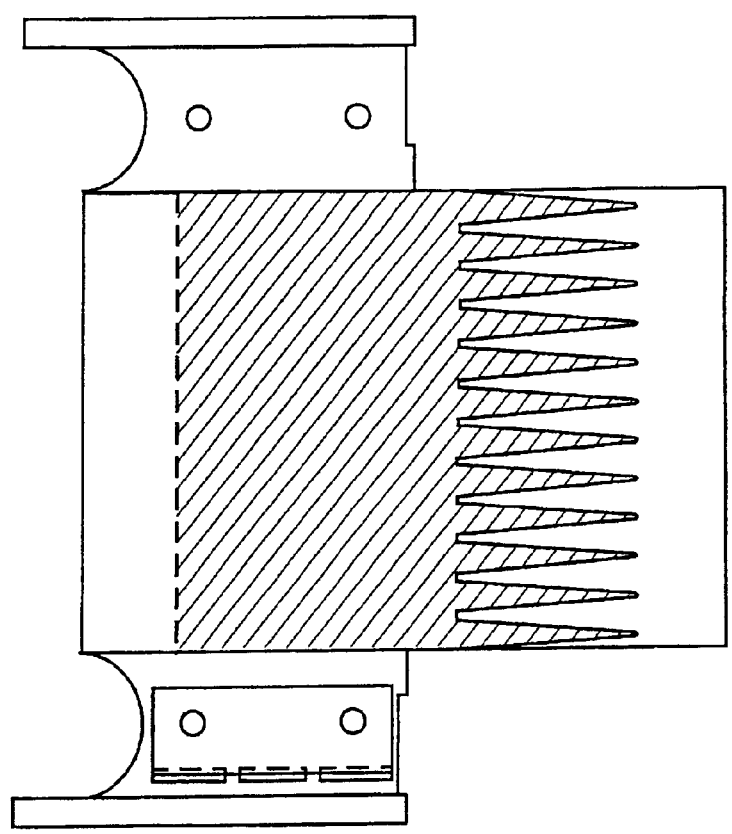
FIG. 8 shows a slide for one filter in a set for use in the compact construction shown in FIGS. 6 and 7.
Figure 9:
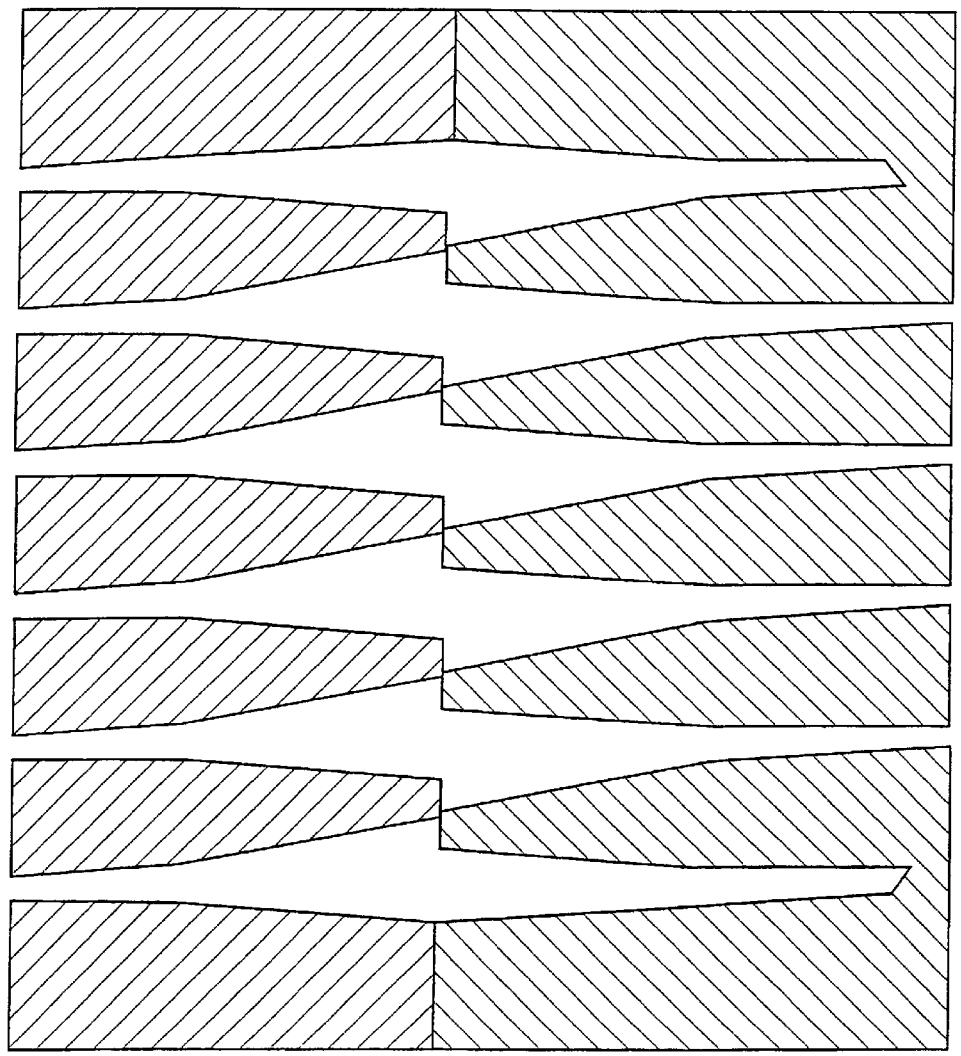
FIG. 9 is an enlargement of the layout of a tomblike construction according to the invention in the edge-to-edge position between non-overlap and overlap of the filters.

It is desired that the individual pairs of combs C for each CMYC filter shall be as close as possible and to be easily removable for cleaning. Referring to FIG. 8, the comb C itself comprises a dichroic coating etched to the appropriate comblike shape as described above. It is mounted on a C-shaped metal frame the edges of which fit into plastic flanges. On one side of the metal frame is attached a right-angled clip C1. Referring to FIG. 7, this frame sits between grooves in two plastic rails G1, G2, the plastic flanges enabling reduced friction for translational movement along the groove. The grooves house two pairs of combs, an upper and a lower pair. Each double groove is pivoted at one end, the pivots lying diametrically opposite one another for the top and bottom set. The other end of the grooves is sprung allowing for the removal of the comb frames. In the operational position, the sprung grooves hold fast the two pairs of combs, while allowing for translational movement. Two motorised toothed belts B are stretched between a driven wheel and a free moving wheel. The top belt is attached to the underside pair of combs, one on the top moving train, the other on the bottom, so that when the motor is actuated, the combs either move towards each other, or away. The top pair of combs is attached in a similar fashion to the bottom belt.

This module accounts for two of the four CMYC comb pairs. The module is designed so that a similar module housing the other two pairs can be placed directly on top, with both pairs of double combs facing each other.

The individual combs are thus easily removed for cleaning by unclipping the belt and pulling the sprung pivoted grooves apart. The springs hold firmly the pairs of combs allowing for accurate translational movement as well as a substantial noise reduction.

It will be appreciated that there may be an advantage to having both ends of the grooves sprung. In this embodiment one of the top or bottom set of grooves may be held static.

Toothed Comblike Mechanical Dimmer

Figure 24:
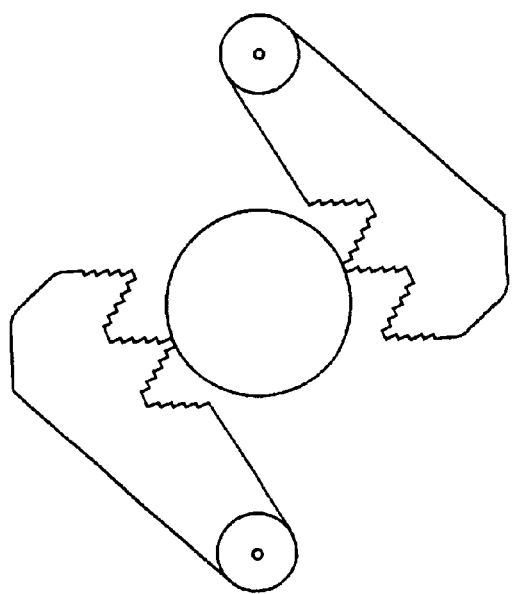
FIG. 24 shows a set of opaque blades which cooperate to control the intensity of the light filtered by the system, in a position in which there is no dimming.
Figure 25:
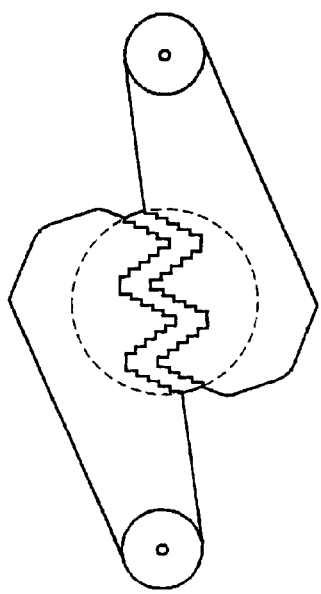
FIG. 25 shows the set of opaque blades in an intermediate position dimming the intensity to ca. 10%.

A comblike structure in a dimmer system according to similar principles of interacting combs is also advantageous for all the same reasons as outlined above. The comblike structures may be designed according to the same principles as applied to the control of saturation in a set of filters and may be subjected to the same type of relative movement. The requirement is that the dimming be as uniform as possible across the field of illumination. This is particularly important when using a three or four colour mixing system. With dimmer blades made in an opaque material, the further into the light aperture they encroach, the more the light output is dimmed. The dimmer structure may be carried on slides or on arms, in which case they may be termed "flags". The dimmer blades are maintained very much out of focus, farthest away from the focal plane of projection so that they themselves are not distinguishable as a sharp profile. With the dimmer blades of the present invention, as shown for one embodiment in FIGS. 24–26, this requirement for uniformity is satisfied by providing as uniform a distribution across the field of the aperture as possible. As the blades encroach the aperture field (shown as a white circle), the large profile teeth (for simplicity shown here with two per blade) intersect as substantial a portion of the middle of the aperture field as the edges of the aperture field (as seen in FIG. 25). Thus as uniform as possible a distribution across the field is blocked by the blades and the resultant field of illumination (projection or wash) is uniformly dimmed.

Figure 26:
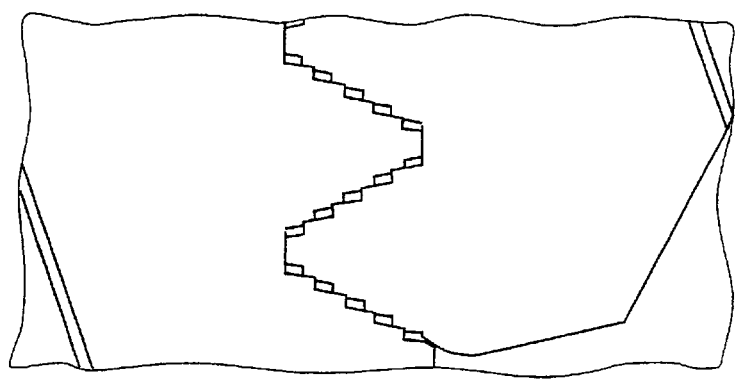
FIG. 26 shows an enlargement of the cooperation between the opaque blades of FIGS. 24; and 25 dimming the intensity to ca. 1%.
Figure 27:
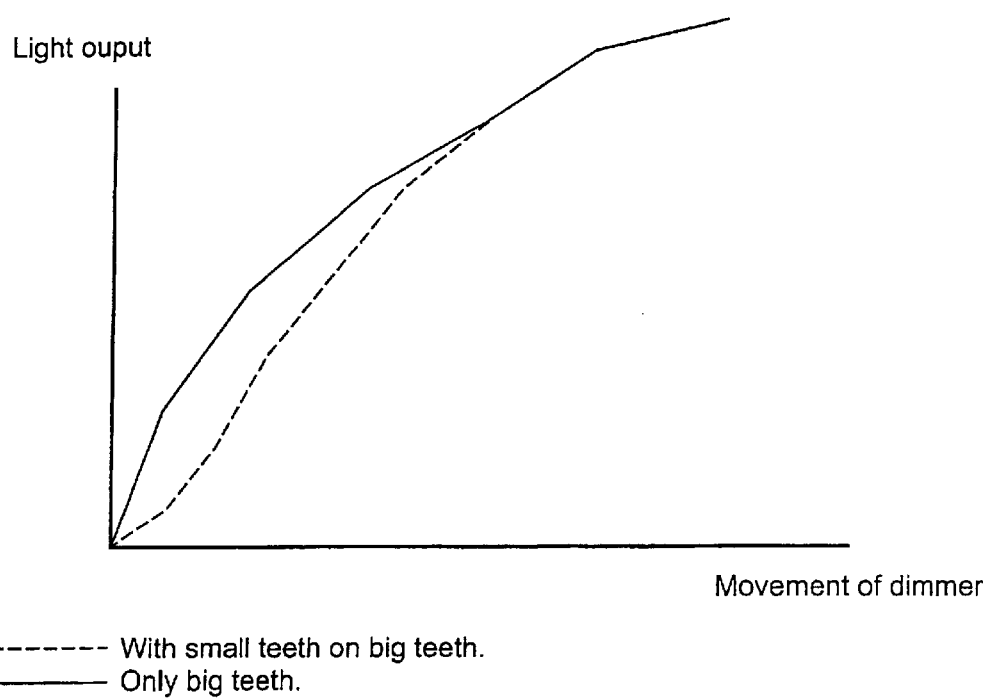
FIG. 27 shows the light intensity in dependence of degree of opening of the opaque dimmer blades.

A further feature of the dimmer blades of the present invention are the several points of inflections (in the present case shown as right-angled steps) which provide the smaller teeth formed in the large profile teeth. As the blades converge to achieve near total obscurity of the aperture field (as shown in FIG. 26), these teeth add resolution to the dimming process at light levels where the eye is most sensitive. The change in light throughput as a function of the displacement of the blades is less substantial. This serves to make the light output vary in a more linear fashion for a given angular displacement of the blades, for all positions of the blades. This is shown in the graph in FIG. 27.

EXAMPLE 1

In a projector for profile projection according to the principle shown in FIG. 3a, the diameter of the elliptical mirror is 116 mm, and the distance between the opening of the mirror and the image (gobo) to be projected is 140 mm. With the discharge light source used this corresponds to a maximum angle ($\phi$)=23°. The set of filters and the dimmer mechanism is mounted close to the placement of the gobo and takes up a total space along the axis of the system of 22 mm. The fingers of the comblike structure are interlaced as shown in FIGS. 12–15. In use the projector shows an evenly lit field for all hues, saturations, and intensities within all distances of throw from 6 m to 200 m.

EXAMPLE 2

In a floodlight (wash) according to the principle shown in FIG. 3b, the diameter of the elliptical mirror is 130 mm, and the distance between the opening of the mirror and the central part of the filter system is 90 mm. With the discharge light source used this corresponds to a maximum angle ($\phi$)=45°. The set of filters and the dimmer mechanism still do not take up more axial space than 22 mm, but additional effects wheels are made available, bringing the total to 40 mm. The fingers of the comblike structure are interlaced as shown in FIGS. 18–23. In use the wash shows an evenly lit field for all combinations of hue, saturation, and intensity for all distances of throw from 4 m to 100 m.

It must be appreciated that some of the above embodiments have particular advantages in other optical systems. The facility and high quality with which the hue, saturation, and/or intensity is varied according to the present invention may indeed improve even the condenser optics versions. It will also be appreciated that any number of kinks and offsets could be included to optimise evenness across each of the components (r, $\theta$, $\phi$) for a particular optical system. The two filters constituting a set may have different comblike layouts. Similarly, the sets for different colours may have different comblike structures according to their axial placement in the ray path. Indeed even fingers on the same comb may have different geometry to optimise evenness of coloration for all spherical and radial components. In addition, the number of and the length of fingers may be altered for a particular application as well as the angles and number of angles of skew (it will be noted for example that it is an advantage to have shorter fingers as this decreases the amount of travel of the combs that is required). Similar considerations apply to geometries bounded by curves.

All of the above improvements to an automated lighting projector when used either singly or in combination serve to provide any number of pleasing and spectacular lighting effects with a greater consistency and higher quality than in prior art constructions. It must be emphasised that the dichroic coatings used in the filter types described in the present text are absolutely uniform but that they have obtained particular shapes according to the principles of the invention.

What is claimed is:

1. An optical system for creating coloured fields of light from a source of essentially white light by the subtractive method, having an independent and continuous control of hue, saturation, and intensity, and comprising at least one set of coloured filters entering to a varying degree into the ray path, in which each set of filters consists of two filters moveable relatively towards and along each other in substantially parallel planes to obtain varying degrees of overlap, and in which the filters in each set have a comblike structure in the colouration and in that said structures are substantially aligned with the direction of movement, characterized in that at least one edge of each tooth of the comblike structure comprises a first edge portion at a first acute angle (p) to the direction of relative movement of the filters and a second edge portion at a second acute angle (s) to the direction of relative movement of the filters, and the first and second angles are not equal, such that the teeth of the comblike structure deviate from a simple isosceles triangular shape.

2. An optical system according to claim 1, characterised in that the geometry of each tooth in each of the filters in a set is individually shaped in dependence of the light collecting system used and the axial position of the set of filters.

3. An optical system according to claim 2, characterised in that the tooth shape is bounded by a combination of curves and straight lines.

4. An optical system according to claim 3, characterised in that the curves display both positive and negative curvature.

5. An optical system according to claim 1, characterised in that the teeth in the comblike structure are tapered with the narrowest part at that edge of each filter which first meets the other filter.

6. An optical system according to claim 5, characterised in that the narrowest parts are cut at an angle with respect to the direction of relative movement.

7. An optical system according to claim 5, wherein the teeth are cut at an angle defined by a circle having its centre outside the edge of each filter which first meets the other filter.

8. An optical system according to claim 5, wherein the sides of a tooth are individually shaped to approach a curved taper from the broad base of the tooth to the narrow end.

9. An optical system according to claim 6, wherein the approximation to a curved taper is obtained by sections of linear taper.

10. An optical system according to claim 2, wherein the width of the teeth in the comblike structure and the distance between the teeth vary on either side of a central curve parallel to the direction of relative movement.

11. An optical system according to claim 4, wherein the width and distance of the teeth increase on either side of a central curve parallel to the direction of relative movement.

12. An optical system according to claim 1, wherein the comblike structure consists of a repetition of a basic tooth shape.

13. An optical system according to claim 1, wherein the filters are aligned such in each set that the comblike structures meet tooth over tooth during the relative movement.

14. An optical system according to claim 1, wherein the filters are aligned such in each set that the comblike structures meet teeth between teeth during the relative movement.

15. An optical system according to claim 1, wherein the direction of the teeth in at least one of the comblike structures is slightly displaced from the direction of relative movement.

16. An optical system according to claim 1, wherein the planes of the filters in each set are slightly angularly displaced with respect to the direction of linear movement in such a way that the edges of each filter which first meets the other filter is closer to the source of light than the other edge.

17. An optical system according to claim 1, additionally comprising a comblike filter set for adjusting the colour temperature of the source of light.

18. An optical system according to claim 1, additionally comprising a set of interacting opaque blades.

19. An optical system according to claim 18, wherein the interacting opaque blades consist of essentially triangular shapes provided with steps.

20. An optical system according to claim 1, wherein the relative movement is obtained by mounting each filter in a set of filters on a slide which obtains a translational movement.

21. An optical system according to claim 1, wherein the relative movement is obtained by mounting each filter in a set of filters on a plane which obtains a rotational movement around a pivot.

22. An optical system according to claim 21, wherein the relative movement is obtained by mounting each filter on an arm which obtains a rotational movement around a pivot.

23. The use of an optical system according to claim 1 in a projector for images.

24. The use of an optical system according to claim 1 in a source for floodlighting.

* * * * *

UNITED STATES PATENT AND TRADEMARK OFFICE
CERTIFICATE OF CORRECTION

| | |
|---|---|
| PATENT NO. | : 6,687,063 B1 |
| APPLICATION NO. | : 10/130681 |
| DATED | : February 3, 2004 |
| INVENTOR(S) | : Rasmussen et al. |

It is certified that error appears in the above-identified patent and that said Letters Patent is hereby corrected as shown below:

On the Title Page:

Item (30)    Foreign Application Priority Data

Please insert

Nov. 18, 1999 (DK) ...................................................... 1999 01657
Jun. 26, 2000 (DK) ...................................................... 2000 00995

Signed and Sealed this

Twenty-sixth Day of June, 2007

JON W. DUDAS
*Director of the United States Patent and Trademark Office*